United States Patent
Wen

(10) Patent No.: US 10,011,945 B2
(45) Date of Patent: *Jul. 3, 2018

(54) CABLE-DRIVING ARRANGEMENT OF A VEHICLE

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 358 days.

This patent is subject to a terminal disclaimer.

(21) Appl. No.: 14/797,730

(22) Filed: Jul. 13, 2015

(65) Prior Publication Data

US 2017/0016178 A1    Jan. 19, 2017

(51) Int. Cl.
| | | |
|---|---|---|
| *D07B 9/00* | (2006.01) | |
| *B60T 11/04* | (2006.01) | |
| *B62M 25/02* | (2006.01) | |
| *F16D 125/60* | (2012.01) | |

(52) U.S. Cl.
CPC .............. *D07B 9/00* (2013.01); *B60T 11/046* (2013.01); *B62M 25/02* (2013.01); *F16D 2125/60* (2013.01)

(58) Field of Classification Search
CPC .................................. F16C 1/20; D07B 9/00
See application file for complete search history.

(56) References Cited

U.S. PATENT DOCUMENTS

| | | | | |
|---|---|---|---|---|
| 2,009,206 | A * | 7/1935 | Rosner | D07B 9/00 219/150 R |
| 3,750,453 | A * | 8/1973 | Dryden | D07B 9/00 29/517 |
| 4,456,451 | A * | 6/1984 | Vosper | B29C 57/10 249/78 |
| 4,541,303 | A * | 9/1985 | Kuzunishi | F16C 1/14 74/502.5 |
| 5,622,081 | A * | 4/1997 | Clements | B62M 11/04 280/238 |
| 8,191,347 | B2 * | 6/2012 | Nagode | D07B 1/148 57/210 |
| 2003/0173786 | A1 * | 9/2003 | Miyagawa | F16C 1/107 292/262 |
| 2010/0064840 | A1 * | 3/2010 | Gordy | F16C 1/105 74/502.4 |
| 2013/0081509 | A1 * | 4/2013 | Nishimura | F16C 1/205 74/502.5 |
| 2015/0143942 | A1 * | 5/2015 | Lalonde | B29C 70/766 74/501.6 |
| 2017/0082138 | A1 * | 3/2017 | Wen | B60T 11/046 |

FOREIGN PATENT DOCUMENTS

| | | |
|---|---|---|
| TW | 225222 | 6/1994 |
| TW | M362811 | 8/2009 |
| TW | M365315 | 9/2009 |

* cited by examiner

*Primary Examiner* — Shaun R Hurley
(74) *Attorney, Agent, or Firm* — Muncy, Geissler, Olds & Lowe, P.C.

(57) ABSTRACT

A cable-driving arrangement of a vehicle includes a cable main body. The cable main body is composed of a plurality of unit filaments, and distal ends of the unit filaments are melted to be integral to form a melted end. The cable main body is for being relatively positionably disposed on a vehicle with a portion near the melted end.

9 Claims, 6 Drawing Sheets

CABLE-DRIVING ARRANGEMENT OF A VEHICLE

BACKGROUND OF THE INVENTION

Field of the Invention

The present invention relates to a driving system, and more particularly to a cable-driving arrangement of a vehicle.

Description of the Prior Art

Conventionally, a cable is often used in a brake system or a transmission system. As disclosed in TWM 365315 and TW 225222, the cable used in a vehicle is composed of a plurality of filaments, and the cable is cut into different lengths according to various requirements. However, once the cable is cut, a distal end of the cable is sharp and bifurcates easily. When the cable is disposed through an outer tube, the filaments which are sharp bifurcate easily and may insert into the outer tube; therefore, it is difficult to assemble the cable, and the outer tube may be damaged.

In addition, another cable is disclosed in TWM 362811. After the cable is fixedly clamped on a brake or an engaging mechanism of a transmission, the exposed and sharp distal end of the cable is sleeved with a metal sheath, and the metal sheath is pressed to restrain the distal end of the cable to prevent damage. However, a user needs spend time and money to purchase and assemble the metal sheath, and when the distal end of the cable is pressed, the filaments may bifurcate and damage the cable.

The present invention has arisen to mitigate and/or obviate the afore-described disadvantages.

SUMMARY OF THE INVENTION

The major object of the present invention is to provide a cable-driving arrangement of a vehicle. A distal end of a cable main body, which is composed of a plurality of unit filaments, forms a melted end for being smoothly disposed through an outer tube and avoiding inserting into an outer tube, and the distal end is melted integrally in one piece to enhance the connection of the unit filaments of the cable main body.

To achieve the above and other objects, a cable-driving arrangement of a vehicle is provided, including a cable main body. The cable main body is composed of a plurality of unit filaments, and distal ends of the unit filaments are melted to be integral to form a melted end. The cable main body is for being relatively positionably disposed on a vehicle with a portion near the melted end.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Please refer to FIGS. 1, 2, 2A, 2B, 3 and 4 for a preferred embodiment of a cable-driving arrangement of a vehicle of the present invention. The cable-driving arrangement includes a cable main body 10. The cable main body 10 is composed of a plurality of unit filaments 11 (the unit filaments may be twisted or stuck together, and the unit filament may be made of a metal or a composite material), and distal ends of the unit filaments 11 are melted to be integral to form a melted end 12. The cable main body 10 is for being relatively positionably disposed on a vehicle (for example, a bicycle or a motorcycle) with a portion near the melted end 12.

Figure 1:
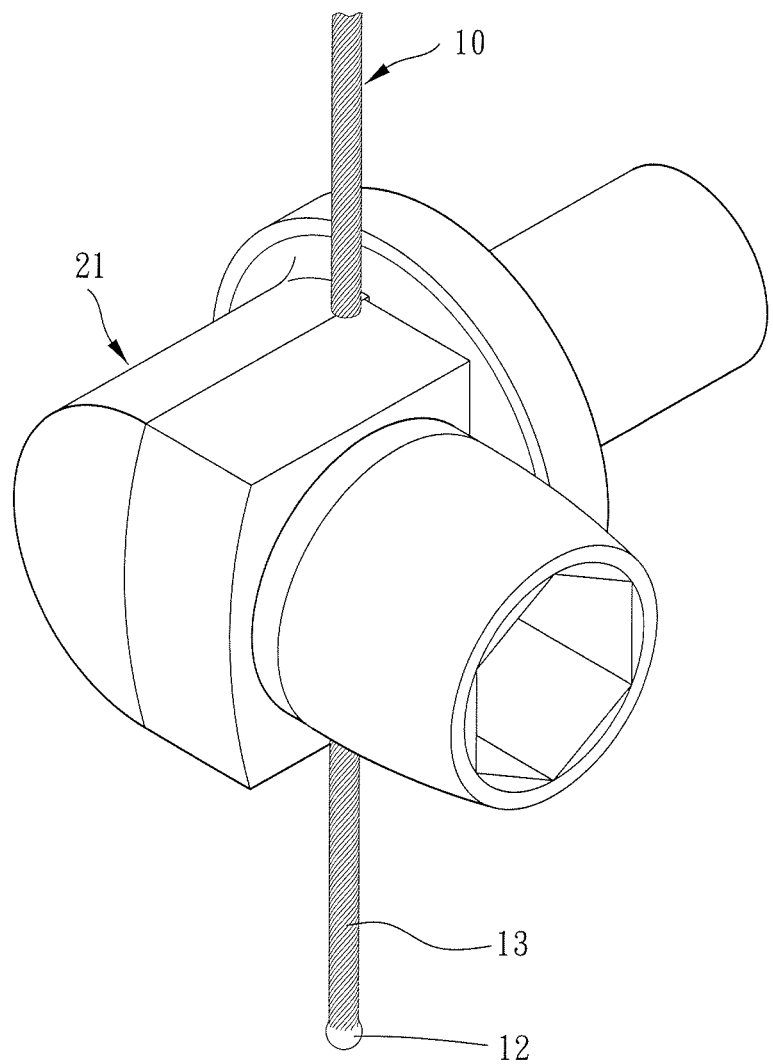
FIG. 1 is a perspective drawing of a preferred embodiment of the present invention.
Figure 2:
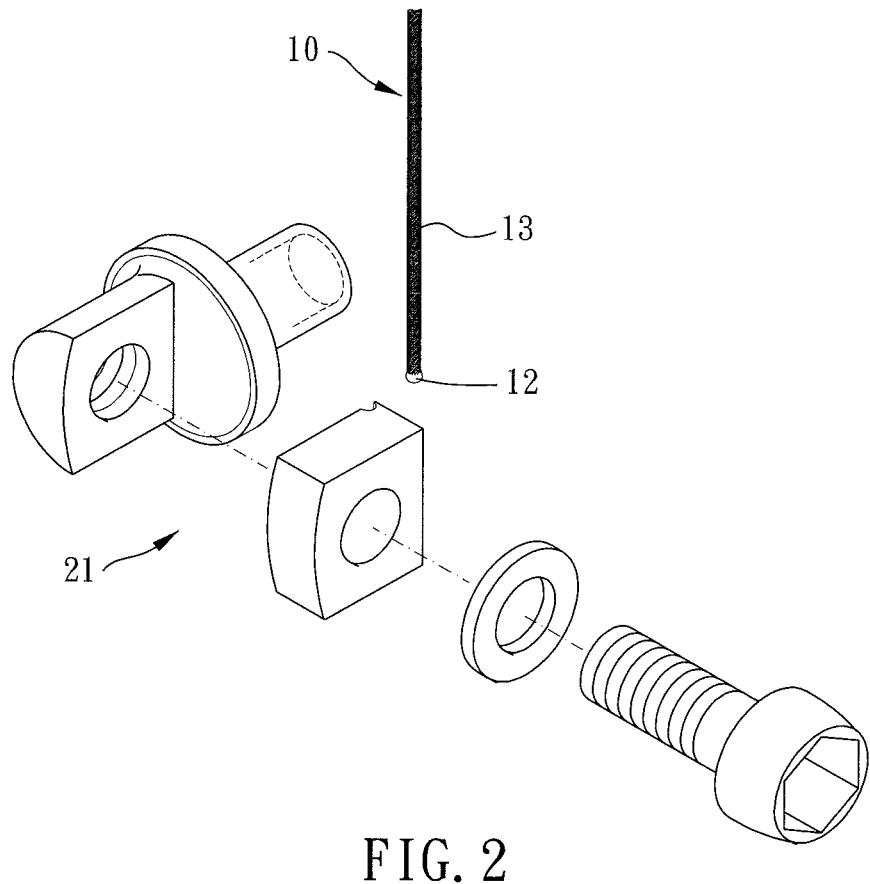
FIG. 2 is a breakdown drawing of the preferred embodiment of the present invention.
Figure 2B:
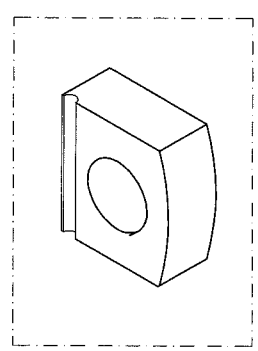
FIG. 2B is a drawing showing a part of a restraining mechanism according to the preferred embodiment of the present invention.
Figure 2A:
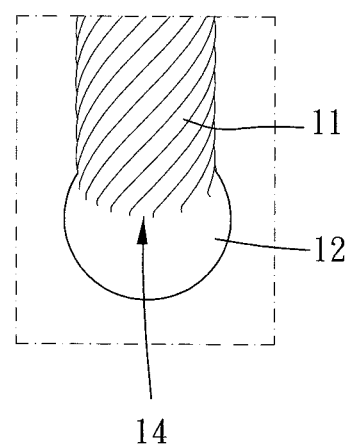
FIG. 2A is an enlarged drawing of a cable main body according to the preferred embodiment of the present invention.
Figure 3:
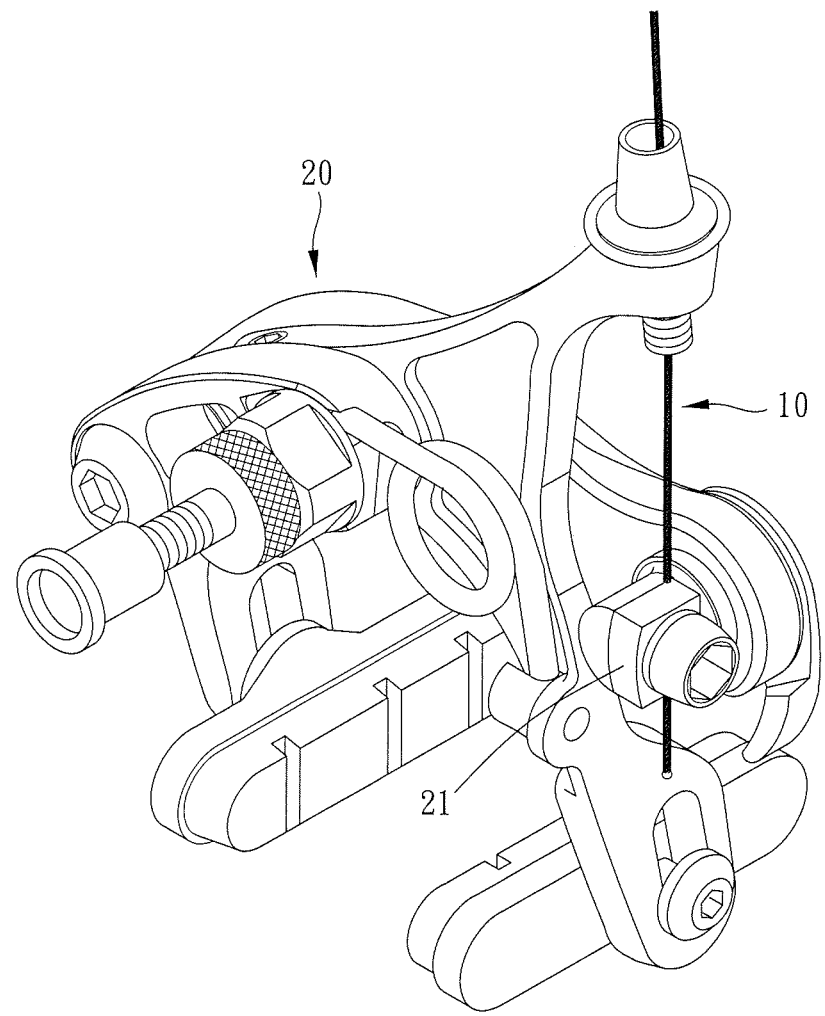
FIGS. 3 to 5 are drawings showing the preferred embodiment of the present invention in use.
Figure 4:
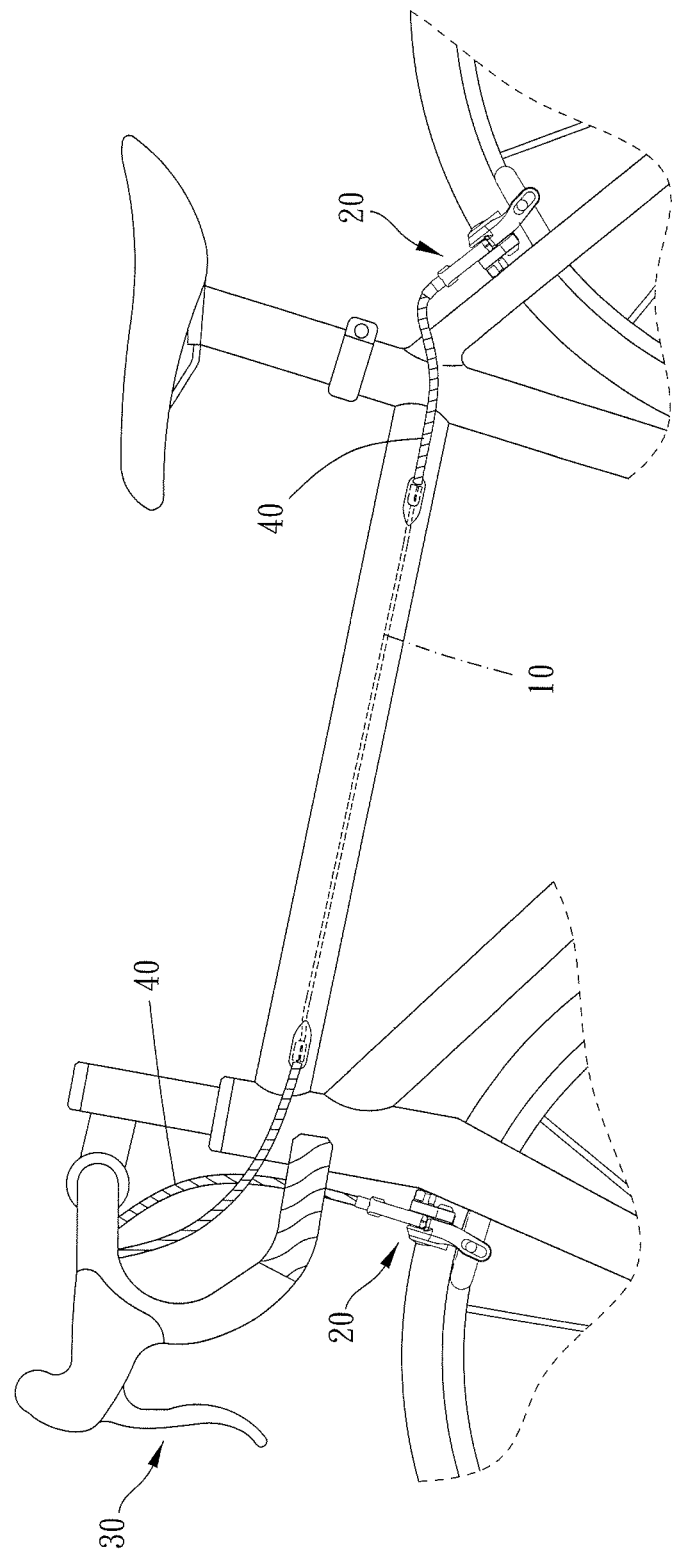
Figure 5:
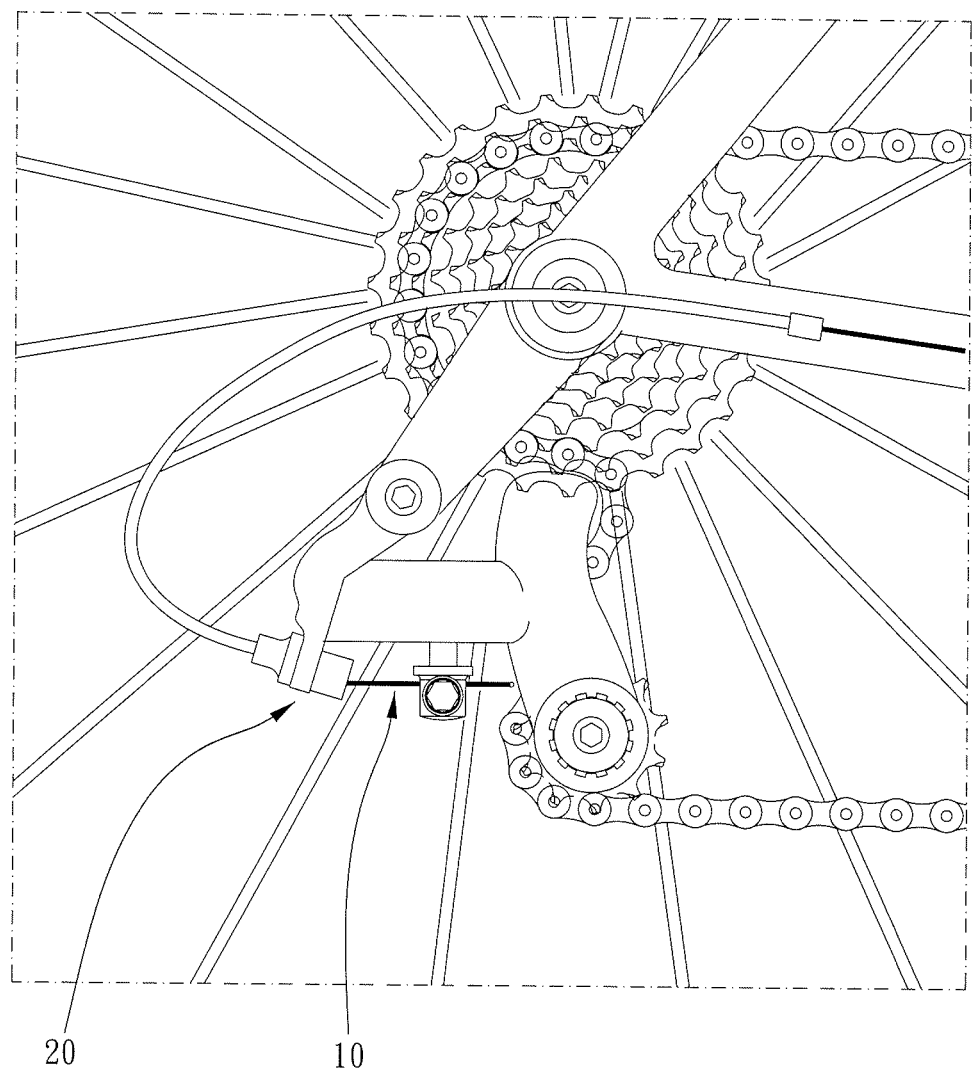

Specifically, the cable-driving arrangement may further include an actuated mechanism 20 and an operating mechanism 30. The cable main body 10 is comovably fixedly connected with between the actuated mechanism 20 and the operating mechanism 30. The operating mechanism 30 can be operated to drive the cable main body 10 to actuate the actuated mechanism 20. In this embodiment, the actuated mechanism 20 is a brake device assembled on a bicycle (as shown in FIG. 3), and the operating mechanism 30 may be a lever assembled on the bicycle. The actuated mechanism 20 may also be a transmission device (as shown in FIG. 5). The cable main body 10 is fixedly clamped by a restraining mechanism 21 of the actuated mechanism 20, and the melted end is located outside the restraining mechanism 21.

Figure 6:
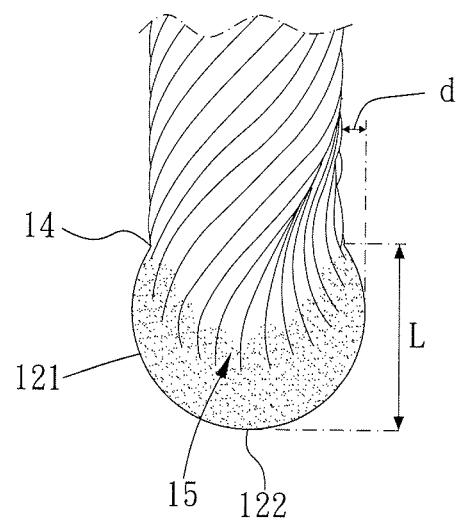
FIGS. 6 to 8 are partial cross-sectional drawings showing the present invention in different types.

The melted end 12 can prevent the unit filaments 11 from separating from bifurcating and inserting into an outer tube 40. An outer surface of the melted end 12 is a continuously curved smooth face 121 which allows the cable main body 10 to be disposed through the outer tube 40 smoothly. The cable main body 10 further includes a filament gather section 13, and the melted end 12 is enlarged relative to the filament gather section 13 and integrally connected with an end of the filament gather section 13. A side of the melted end 12 radially exceeds beyond the filament gather section 13 in a predetermined distance d (as shown in FIG. 6), and the predetermined distance d is preferably between 0.3 to 1.5 times a diameter of the unit filament 11 so as to prevent abrasion between the filament gather section 13 having the relatively smaller diameter and the outer tube 40.

Figure 7:
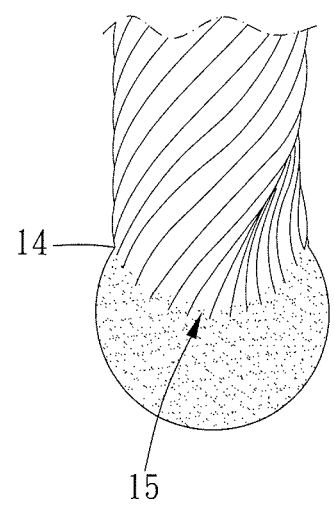
Figure 8:
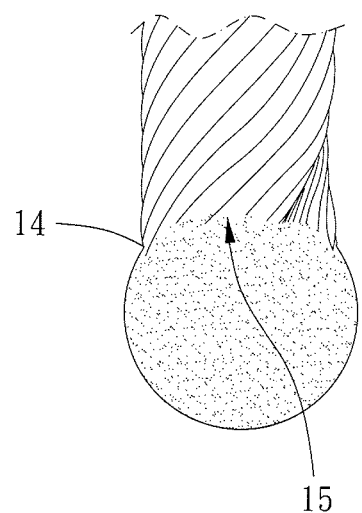

Preferably, an extent L of the melted end 12 along a longitudinal direction of the cable main body 10 is between 1 to 5 times the diameter of the unit filament 11. In a lengthwise cross-sectional profile of the melted end 12, the filament gather section 13 and the melted end 12 adjoin each other to form an outer adjoining edge 14 and an inner adjoining face 15 (as shown in FIGS. 6 to 8). The melted end 12 further includes a distal end face 122, and a dimension from the inner adjoining face 15 to the distal end face 122 is preferably between 0.5 to 8 times the diameter of the unit filament 11 (preferably greater than or equal to the diameter of the unit filament 11) in accordance with different dimensions of unit filaments 11 so as to enhance the connection of the unit filaments 11 of the cable main body 10. The distal end face 122 is part of a ball surface and the endmost surface of the cable main body 10. A diameter of the melted end 12 is smaller than 1.5 times a diameter of the filament gather section 13.

Figure 9:
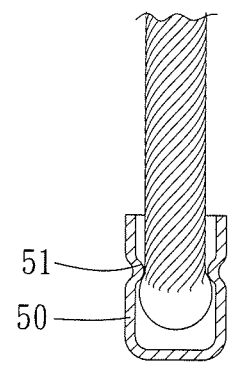
FIG. 9 is a drawing showing another preferred embodiment of the present invention in use.

In addition, please further refer to FIG. 9. The melted end 12 can be sleeved with a sheath 50, for example, a metal sheath. An inner wall of the sheath 50 includes a restraining portion 51 which is interferable with the melted end 12 in the longitudinal direction of the cable main body 10. The restraining portion 51 may be formed through pressing the sheath 50 from outside to make the inner wall of the sheath 50 protrude inward, so the cable main body 10 and the sheath 50 are restrainingly assembled with each other without the sheath 50 being pressed hardly to snap the cable main body 10. Therefore, the cable main body 10 will not be damaged, and the unit filaments 11 will not bifurcate.

Given the above, a distal end of the cable-driving arrangement is a melted end which can be disposed through an outer tube smoothly to prevent from inserting into the outer tube. The distal end is melted integrally in one piece to enhance the connection of the unit filaments of the cable main body.

In addition, the melted end can be further sleeved with a sheath which can restrain the melted end without damaging the cable main body.

While we have shown and described various embodiments in accordance with the present invention, it should be clear to those skilled in the art that further embodiments may be made without departing from the scope of the present invention.

What is claimed is:

1. A cable-driving arrangement of a vehicle, including:
   a cable main body, composed of a plurality of unit filaments, the unit filaments being made of metal twisted together, distal ends of the unit filaments melted in one piece to form a melted end, the cable main body for being relatively positionably disposed on a vehicle with a portion near the melted end;
   wherein the melted end includes a distal end face which is a part of a ball surface and is the endmost surface of the cable main body;
   wherein the cable main body further includes a filament gather section, and the melted end is enlarged relative to the filament gather section and integrally connected with an end of the filament gather section;
   wherein a diameter of the melted end is smaller than 1.5 times a diameter of the filament gather section.

2. The cable-driving arrangement of claim 1, wherein an outer surface of the melted end is a continuously curved smooth face.

3. The cable-driving arrangement of claim 1, wherein a side of the melted end radially exceeds beyond the filament gather section in a predetermined distance, and the predetermined distance is between 0.3 to 1.5 times a diameter of the unit filament.

4. The cable-driving arrangement of claim 1, wherein in a lengthwise cross-sectional profile of the melted end, the filament gather section and the melted end adjoin each other to form an outer adjoining edge and an inner adjoining face.

5. The cable-driving arrangement of claim 4, wherein a dimension from the inner adjoining face to the distal end face is between 0.5 to 8 times a diameter of the unit filament.

6. The cable-driving arrangement of claim 1, wherein an extent of the melted end along a longitudinal direction of the cable main body is between 1 to 5 times a diameter of the unit filament.

7. The cable-driving arrangement of claim 1, wherein the cable main body is comovably fixedly connected with an actuated mechanism.

8. The cable-driving arrangement of claim 1, wherein the cable main body is comovably fixedly connected with an operating mechanism.

9. The cable-driving arrangement of claim 1, wherein the melted end is further sleeved with a sheath, and an inner wall of the sheath includes a restraining portion which is interferable with the melted end in a longitudinal direction of the cable main body.

* * * * *